United States Patent
Fernandes et al.

(10) Patent No.: US 12,252,162 B2
(45) Date of Patent: Mar. 18, 2025

(54) MULTI-CHANNEL COMMUNICATION BETWEEN END OF TRAIN DEVICE AND HEAD OF TRAIN DEVICE

(71) Applicant: Siemens Mobility, Inc., New York, NY (US)

(72) Inventors: Mario Fernandes, Jacksonville, FL (US); Omer Metel, Anchorage, KY (US)

(73) Assignee: Siemens Mobility, Inc., New York, NY (US)

( * ) Notice: Subject to any disclaimer, the term of this patent is extended or adjusted under 35 U.S.C. 154(b) by 415 days.

(21) Appl. No.: 17/446,373

(22) Filed: Aug. 30, 2021

(65) Prior Publication Data

US 2023/0065249 A1 Mar. 2, 2023

(51) Int. Cl.
*B61L 15/00* (2006.01)
*H04W 28/08* (2023.01)
*H04W 36/30* (2009.01)
*H04W 80/04* (2009.01)

(52) U.S. Cl.
CPC ....... *B61L 15/0054* (2013.01); *B61L 15/0027* (2013.01); *H04W 28/0967* (2020.05); *H04W 36/302* (2023.05); *H04W 80/04* (2013.01); *B61L 2205/02* (2013.01); *B61L 2205/04* (2013.01)

(58) Field of Classification Search
CPC ................ H04W 80/04; B61L 15/0054; B61L 15/0027; B61L 15/0018; B61L 3/125
See application file for complete search history.

(56) References Cited

U.S. PATENT DOCUMENTS

| | | | |
|---|---|---|---|
| 6,505,104 B2* | 1/2003 | Collins | B61L 27/40 701/19 |
| 2003/0214417 A1* | 11/2003 | Peltz | B61L 25/028 340/4.3 |
| 2016/0068173 A1* | 3/2016 | Fuchs | B61L 15/0027 340/994 |
| 2016/0096538 A1* | 4/2016 | Bartek | B61L 27/70 246/28 R |
| 2020/0353961 A1* | 11/2020 | Bonnes | G01S 19/50 |

* cited by examiner

*Primary Examiner* — Logan M Kraft
*Assistant Examiner* — Joshua Campbell

(57) ABSTRACT

An automatic train communications system includes a plurality of electronic train devices and a multi-channel communications network, wherein each electronic train device comprises a radio module configured to support a plurality of communications protocols and a plurality of frequency bands, and select a communications protocol and/or a frequency band from the plurality of communications protocols and frequency bands based on at least one performance criterium to reliably communicate with one or more electronic train devices via the multi-channel communications network.

17 Claims, 3 Drawing Sheets

MULTI-CHANNEL COMMUNICATION BETWEEN END OF TRAIN DEVICE AND HEAD OF TRAIN DEVICE

BACKGROUND

1. Field

Aspects of the present disclosure generally relate to communication between an end of train device and a head of train device, in connection with a railroad vehicle, such as a freight train.

2. Description of the Related Art

Within the railway industry, an end of train device, herein also referred to as EOT, is an electronic device which performs a number of functions, some of which are required by regulations of the Federal Railroad Administration (FRA). The EOT is typically attached at a rear of a last car on a railway vehicle or train, often to an unused coupling on an end of the last car opposite a head of the train.

EOTs were originally designed to perform some of the functions previously performed by train personnel located in the caboose, thereby allowing trains to operate without a caboose and with a reduced number of train personnel. For example, an EOT can monitor air pressure in the air brake pipe and transmit this information to a head of train device, herein also referred to as HOT. A head of train device is attached at a first car on the train, for example a locomotive, opposite the EOT. Further, EOTs also often include an end-of-train marker light to alert trailing trains on the same track of the presence of the end of the train. Two-way EOTs can accept commands from the HOT, for example to open a valve to release pressure in the air brake pipe so that the train's air brakes activate to stop the train in an emergency. EOTs and HOTs can comprise many other components and/or functions.

Since EOTs and HOTs communicate from one end of the train to the other, they experience many communication failures due to length and composition of the train, as well as due to unfavorable terrain conditions, track layout, vegetation, and environmental factors. As railroads operate longer and longer trains, communication between EOT and HOT become less reliable, causing more frequent comms failures leading to train delays and loss of productivity.

SUMMARY

Briefly described, aspects of the present disclosure generally relate to communications between an end of train device, herein also referred to as EOT, and a head of train device, herein also referred to as HOT, in connection with a railroad vehicle. The EOT and HOT are suitable for railway vehicles such as freight trains and passenger trains. Further aspects relate to an automatic train communications system and a method for communicating between multiple electronic train devices.

A first aspect of the present disclosure provides an electronic train device suitable of use on a railway vehicle comprising a radio module configured, through operation of at least one processor, to support a plurality of communications protocols and a plurality of frequency bands, and select a communications protocol and/or a frequency band from the plurality of communications protocols and frequency bands based on at least one performance criterium to reliably communicate with another electronic train device.

A second aspect of the present disclosure provides an automatic train communications system comprising a plurality of electronic train devices, a multi-channel communications network, wherein each electronic train device comprises a radio module configured, through operation of at least one processor, to support a plurality of communications protocols and a plurality of frequency bands, and select a communications protocol and/or a frequency band from the plurality of communications protocols and frequency bands based on at least one performance criterium to reliably communicate with one or more electronic train devices via the multi-channel communications network.

A third aspect of the present disclosure provides a method of communicating between multiple electronic train devices, the method being performed by an electronic train device and comprising evaluating available communications protocols, frequency bands and communications paths, auto-negotiating and selecting a first communications protocol and/or a first frequency band, and communication path based on availability and compatibility with another electronic train device, and communicating with the other electronic train device using the selected communications protocol and/or frequency band and communication path.

DETAILED DESCRIPTION

To facilitate an understanding of embodiments, principles, and features of the present disclosure, they are explained hereinafter with reference to implementation in illustrative embodiments. In particular, they are described in the context of flexible multi-channel communication between multiple electronic train devices, such as for example EOT and a HOT, in connection with a railway vehicle.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
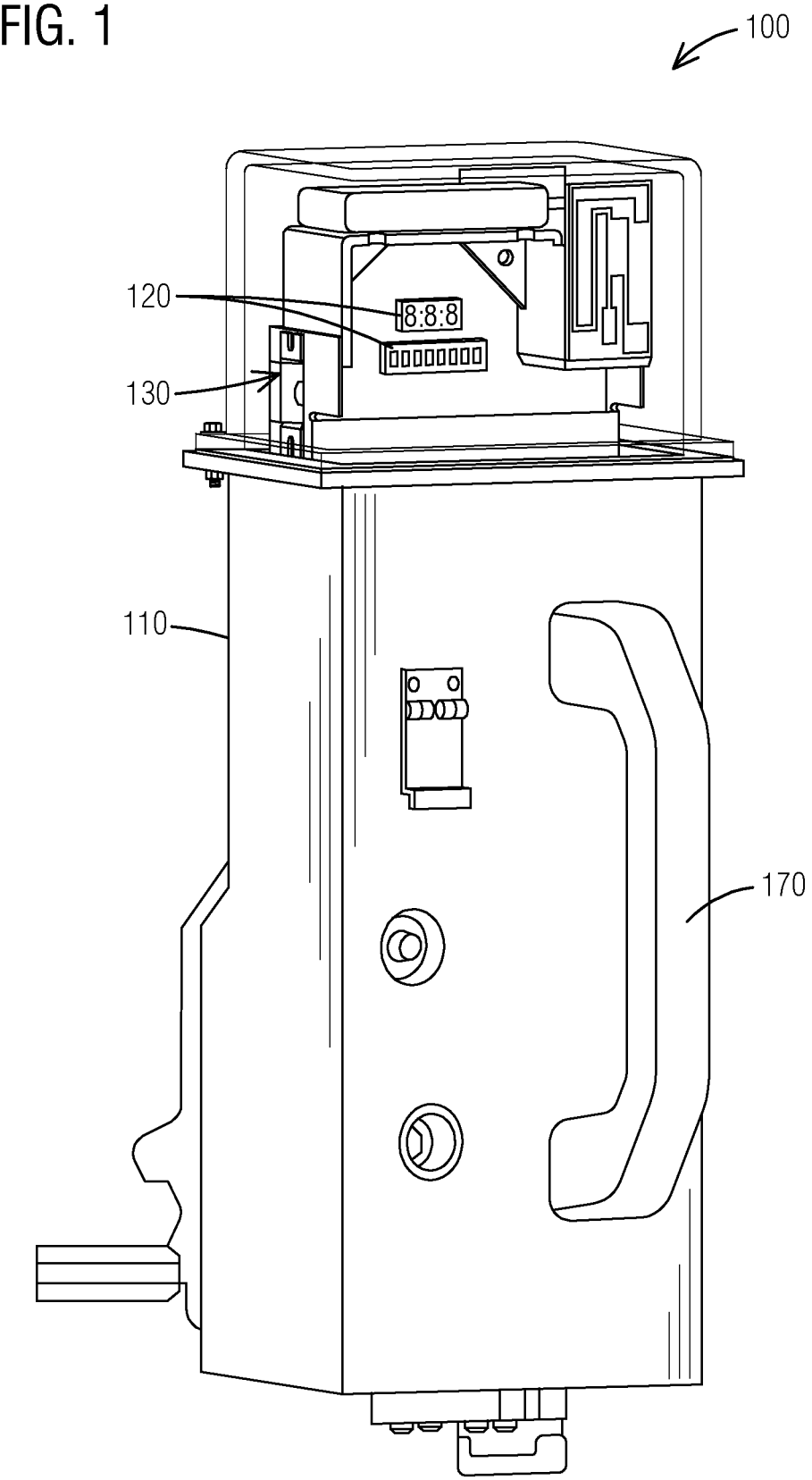
FIG. 1 illustrates a perspective view of an end of train device (EOT) in accordance with an exemplary embodiment of the present disclosure.

FIG. 1 illustrates a view of an EOT 100 in accordance with an exemplary embodiment of the present disclosure. The EOT 100 is suitable of use on a railway vehicle located on a last train car of the railway vehicle, for example a freight train. The EOT 100 comprises an enclosure 110, and a plurality of components, such as electronic components, positioned inside the enclosure 110. For example, one or more displays 120 are positioned inside the enclosure 110.

The one or more displays 120 display information and/or data provided by the EOT 100. An important component of the EOT 100 is a high visibility marker light (HVM) 130 which is utilized to illuminate a rearward of the railway vehicle. The EOT 100 further comprises a coupling unit (not visible in FIG. 1), typically attached to the housing 110, which couples the EOT 100 to the last train car, for example a train car coupling.

Examples of other components of the EOT 100 include cell phone transceivers, systems for monitoring/controlling brake lines and pressure, communication systems for communicating with other units, such as for example HOTs etc. The EOT 100 further comprises a handle 170 attached to the housing 110 for handling such as installation and removal of the EOT 100 on/off a train car of a railway vehicle, in particular a last train car. It should be noted that one of ordinary skill in the art is familiar with structure, components and functions of different types of EOTs, and they will not be described in further detail herein.

A head of train device (HOT) can be integrated into locomotive cab electronics or can be a standalone or console mounted unit. When used with an EOT, the HOT provides the locomotive engineer with important information regarding operation of the train. These conditions include brake pipe pressure and various status conditions. The EOT transmits data via a telemetry link, for example radio-based telemetry, to the HOT in the locomotive.

As described earlier, since EOTs and HOTs communicate from one end of the train to the other, they experience many communication failures due to length and composition of the train, as well as due to unfavorable terrain conditions, track layout, vegetation, and environmental factors. As railroads operate longer and longer trains, communication between EOT and HOT become less reliable, causing more frequent comms failures leading to train delays and loss of productivity.

Figure 2:
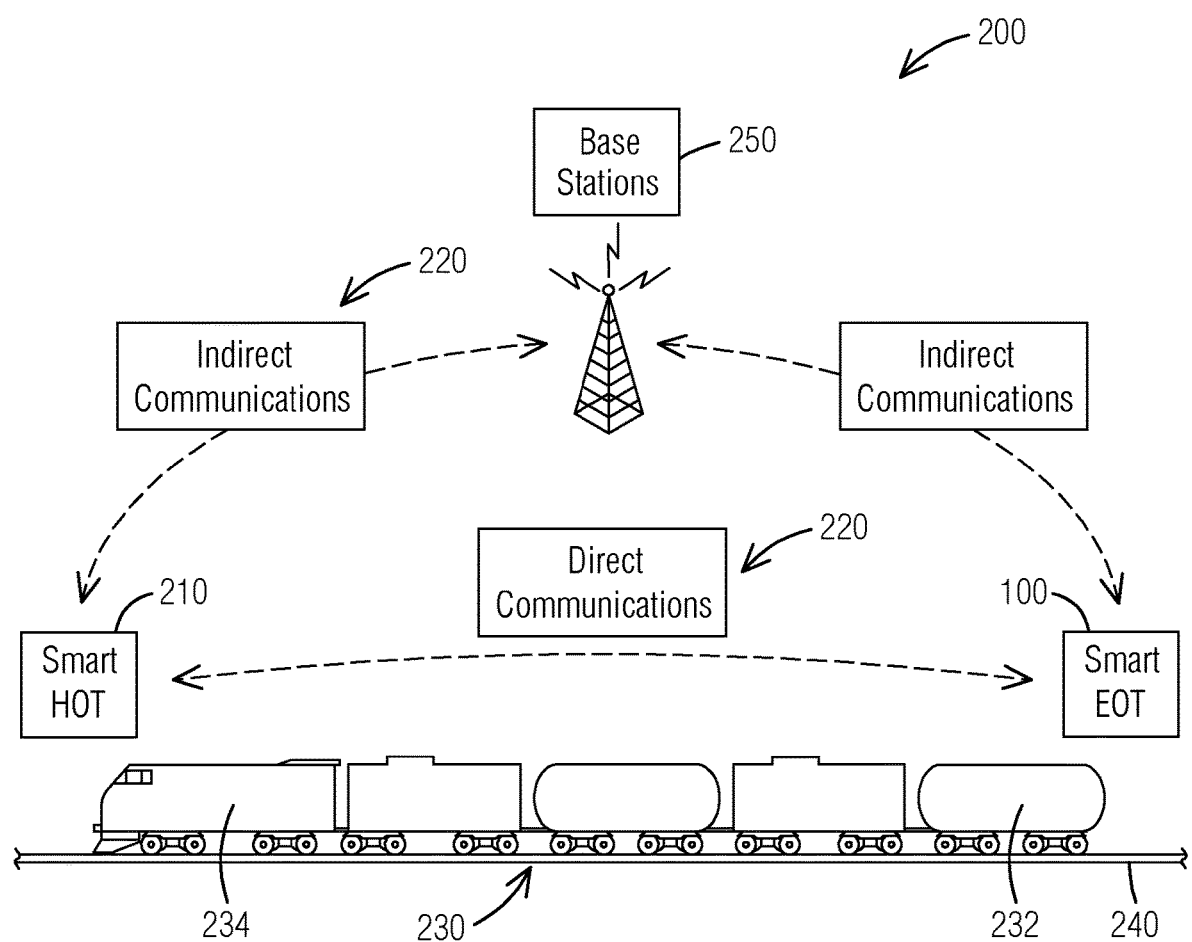
FIG. 2 illustrates a system for a multi-channel communication between EOT and HOT of a railway vehicle in accordance with an exemplary embodiment of the present disclosure.

FIG. 2 illustrates a system for a multi-channel communication between EOT and HOT of a railway vehicle in accordance with an exemplary embodiment of the present disclosure.

Generally, communication system 200 comprises EOT 100, which can be configured for example as described with reference to FIG. 1, HOT 210 and one or more communication network(s) 220, interfacing with different components of the system 200, for example EOT 100 and HOT 210, and adapted to transmit data between the different components. The communication networks can be for direct or indirect communication between the different components. Other components included in the communication system 200 can be for example one or more base station(s) 250 for an indirect communication between EOT 100 and HOT 210. The base station(s) 250 can be located in the vicinity of the train 230 or the railroad track 240 to support communication between EOT 100 and HOT 210. Direct communications between EOT 100 and HOT 210 is communications without intermediate components or devices, whereas indirect communications between EOT 100 and HOT 210 are performed via one or more intermediate components, such as for example base station 250.

The EOT 100 is attached at a rear of a last car 232 on the train 230 travelling on railway track 240. Further, the train 230, specifically locomotive 234, comprises HOT 210. The EOT 100 and HOT 210 are in communication with each other, for example transmitting and/or receiving information, commands, or signals. A typical HOT 210 comprises several lights indicating telemetry status and rear end movement, along with a digital readout of brake line pressure from the EOT 100. The HOT 210 further includes means, for example a switch, for initiating an emergency brake application from the rear end. The HOT 210 can be built into the locomotive's computer system and information is displayed on a computer screen. In an example, the HOT 210 can be integrated into a Positive Train Control (PTC) system of the railway vehicle 230, specifically in the locomotive 234.

Figure 3:
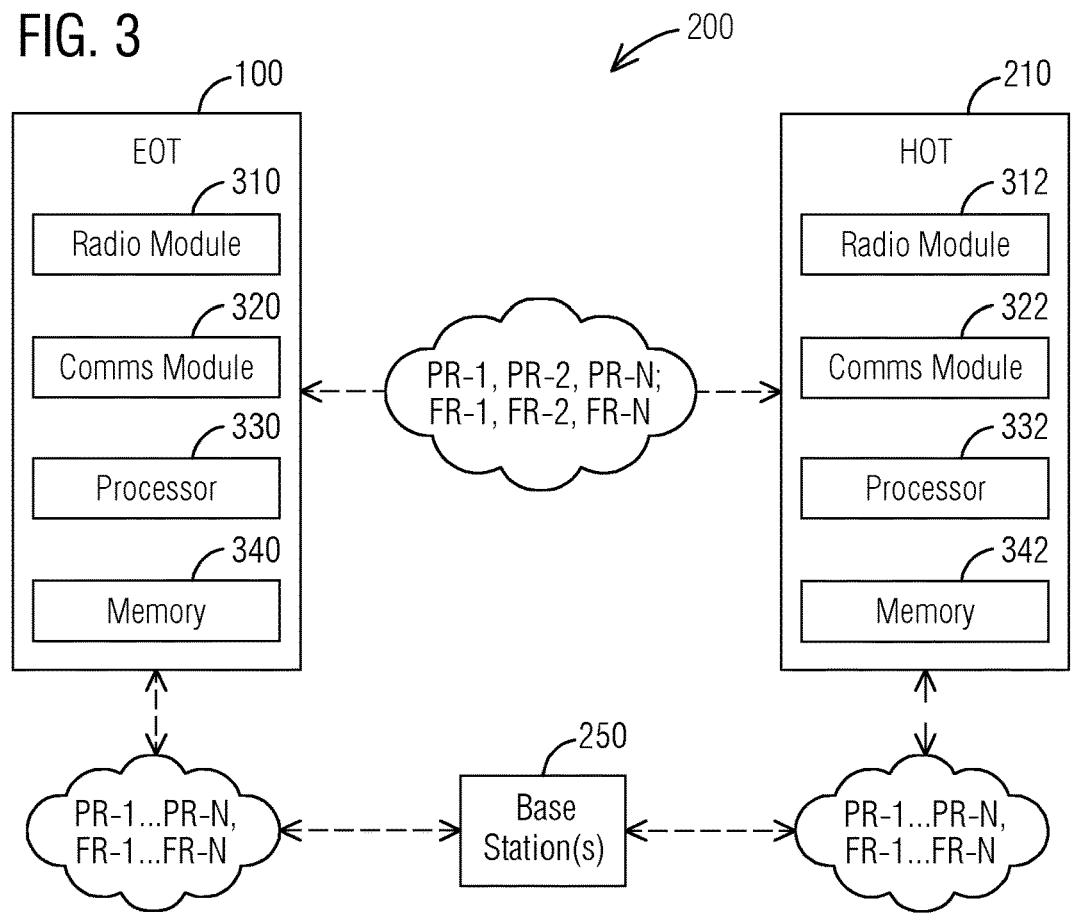
FIG. 3 illustrates a schematic of the system for a multi-channel communication between an EOT and HOT in accordance with an exemplary embodiment of the present disclosure.

FIG. 3 illustrates a schematic of the system 200 for a multi-channel communication between an EOT 100 and HOT 210 in accordance with an exemplary embodiment of the present disclosure.

The EOT 100 and HOT 210 are herein also referred to as electronic train device. In an exemplary embodiment of the present disclosure, each electronic train device, e.g. EOT 100 and HOT 210, comprises a radio module 310, 312, a communication module 320, 322, at least one processor 330, 332 and at least one memory 340, 342. In exemplary embodiments, the memory 340, 342 may include any of a wide variety of memory devices including volatile and non-volatile memory devices, and the at least one processor 330, 332 may include one or more processing units. The memory 340, 342 includes software with a variety of applications, programs, or computer executable instructions.

In an embodiment of the present disclosure, the radio module 310, 312 is configured, through operation of the processor 330, 332, to support a plurality of communications protocols PR-1, PR-2, PR-N and a plurality of frequency bands FR-1, FR-2, FR-N, and to select a communications protocol and/or a frequency band from the plurality of communications protocols PR-1, PR-2, PR-N and frequency bands FR-1, FR-2, FR-N based on at least one performance criteria to reliably communicate with another electronic train device, e.g. EOT 100 and HOT 210. Further, each electronic train device comprises a communication module 320, 322 configured, through operation of the processor 330, 332, to communicate with the other electronic train device using the selected communications protocol PR-1, PR-2, PR-N and/or frequency band FR-1, FR-2, FR-N.

The communication system 200 provides automatic selection of a communications protocol PR-1, PR-2, PR-N and frequency band FR-1, FR-2, FR-N by the electronic train devices to provide a reliable communication between the devices without, or at least minimal, communications failures or gaps. The communication system 200 provides multi-channel or multi-faceted communications because the electronic train devices can select a communication medium, e. g. protocol, frequency band, etc., to best communicate with the other electronic train device.

The radio module 310, 312 may be embodied as software or a combination of software and hardware. The radio module 310, 312 may be a separate module or may be an existing module programmed to perform a method as described herein. For example, the radio module 310, 312 may be incorporated, for example programmed, into an existing device or module (of the EOT 100 or HOT 210) by means of software.

In an exemplary embodiment of the present disclosure, the radio module 310, 312 is configured as software-defined radio, herein also referred to as SDR. Specifically, the EOT 100 and HOT 210 each are equipped with an SDR supporting multiple communication protocols, frequencies, and paths, to allow intelligent and automatic selection of the best, i.e. most reliable, communication method between EOT 100 and HOT 210.

In an embodiment, the plurality of communications protocols PR-1, PR-2, PR-N comprises Association of American Railroads (AAR) S-9152 communications protocol (herein also referred to as Legacy AAR protocol) and Internet Protocol (IP) based protocols including IEEE 802.16s IP-based communications protocol. However, it should be noted that the system 200 may comprise further communications protocols and that the radio module 310, 312 can be configured to support other protocols in addition to the Legacy AAR protocol and the IP-based protocols.

Further, the multiple frequency bands include 450 MHz EOT telemetry band, 220 MHz Positive Train Control (PTC) band, 900 MHz Advanced Train Control System (ATCS) band and 160 MHz voice band. These frequency bands relate to the Legacy AAR protocol. Again, it should be noted that the system 200 may comprise further frequency bands and that the radio module 310, 312 can be configured to support many other frequency bands for communications.

Further, support for IP-based protocols, such IEEE 802.16s IP-based protocol, allows the HOT 210 and EOT 100 to seamlessly switch from direct device-to-device communications to indirect communications via base station(s) 250 when the devices 100, 210 detect that a base station 250 is available nearby.

The radio module 310, 312 is configured to automatically select a communications protocol PR-1, PR-2, PR-N and/or frequency band FR-1, FR-2, FR-N based on at least one performance criterium. The performance criterium is selected from a group of criteria comprising, but not limited to, signal strength, bandwidth availability, channel occupation due to communications traffic of other devices, availability of base station(s) 250 along a route (proximity to communications tower), etc.

In an example, the two (or more) devices (EOT 100 and HOT 210) auto-negotiate with each other to determine which frequency band and communications protocol to use. Through the process of auto-negotiation, HOT 210 and EOT 100 can determine if they both have multi-frequency, multi-protocol and multi-path capability and if so, can decide on the best frequency, protocol and communications path available depending on the conditions present at the time. This intelligent selection is done based on performance criteria as described earlier. The process of auto-negotiation may include receiving some feedback from the counterpart device with respect to availability and compatibility as to communications protocols, frequency bands and communication paths. A communication path, for example indirect via a base station 250 may be available to the EOT 100, but not to the counterpart HOT 210 (base station 250 may be too far away from HOT 210) and thus this path of communication may not be selected, but a different path.

The automatic selection of communications protocol PR-1, PR-2, PR-N and/or frequency band FR-1, FR-2, FR-N, based on evaluation of the performance criteria and/or compatibility with other device(s), can be performed periodically, continuously or at specific times.

In an exemplary embodiment, the selection of the communication protocol PR-1, PR-2, PR-N can be negotiated between the multiple train devices, e. g. EOT 100 and HOT 210, at deployment time of the train 230. The selection of the frequency band FR-1, FR-2, FR-N and communication routing, i.e. direct or indirect communication, can be continuously evaluated and selected based on several performance criteria, such as for example availability of base stations 250 along the route and relative signal strength/performance of available channels. For example, at the time of deployment of the train 230, the EOT 100 and HOT 210 may negotiate and select an IP-based communications protocol, such as IEEE 802.16s IP-based protocol. During travel of the train 230, selection of the frequency band FR-1, FR-2, FR-N and whether communication is direct or indirect via a base station 250 is continuously evaluated and performed, wherein frequency band and direct/indirect communication can be seamlessly switched by the EOT 100 and HOT 210 without communication failures or interruptions.

Figure 4:
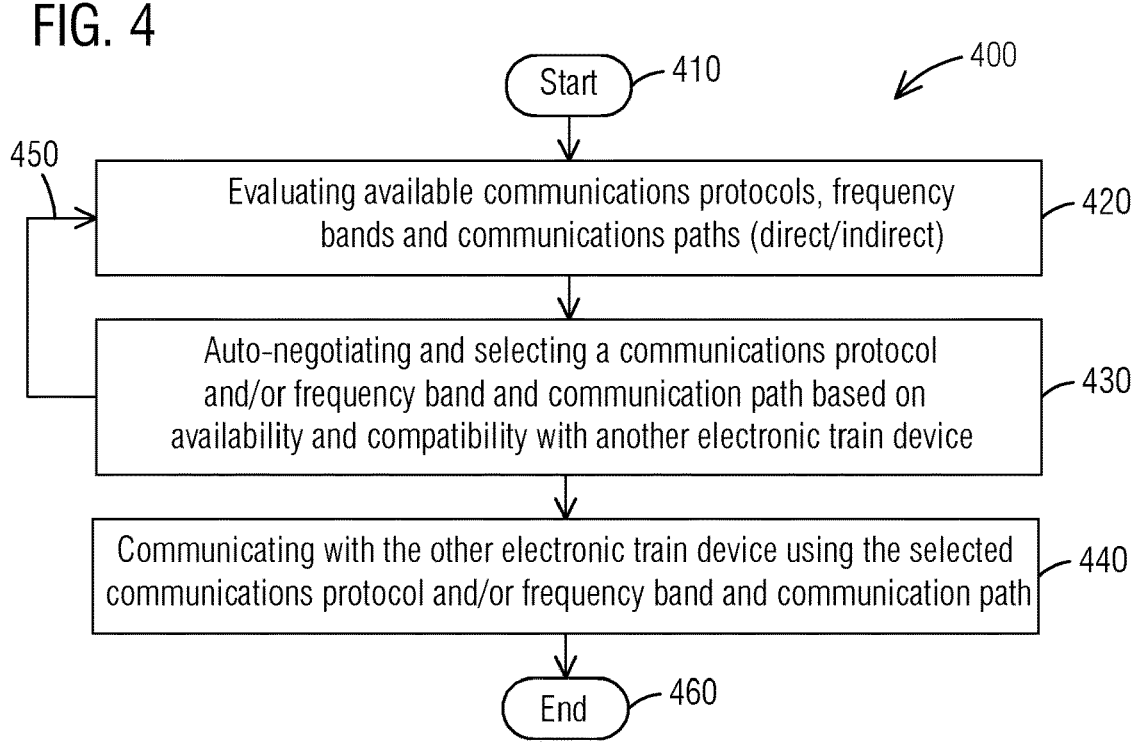
FIG. 4 illustrates a flow chart of a method for communicating between multiple electronic train devices in accordance with an exemplary embodiment of the present disclosures.

FIG. 4 illustrates a flow chart of a method 400 for communicating between multiple electronic train devices in accordance with an exemplary embodiment of the present disclosures. For example, the method 400 may be performed utilizing an automatic train communications system 200 as described with reference to FIG. 2 and FIG. 3.

While the method 400 is described as a series of acts or steps that are performed in a sequence, it is to be understood that the method 400 may not be limited by the order of the sequence. For instance, unless stated otherwise, some acts may occur in a different order than what is described herein. In addition, in some cases, an act may occur concurrently with another act. Furthermore, in some instances, not all acts may be required to implement a methodology described herein.

The method 400 starts at 410 and comprises an act 420 of evaluating available communications protocols, frequency bands and communications paths (direct/indirect), which is performed by an electronic train device, such as EOT 100 and HOT 210. Act 430 comprises auto-negotiating and selecting a first communications protocol and/or a first frequency band and communication path based on availability and compatibility with a second electronic train device. Act 440 comprises communicating with the selected communications protocol and/or frequency band and communication path between the electronic train devices. As described before, availability of communication protocols, frequency bands and communication paths are evaluated in a recurring manner, for example continuously or periodically, indicated by loop 450. At 460, the method ends.

In an embodiment, the auto-negotiating comprises receiving feedback from the other electronic train device as to availability and compatibility with respect to the communications protocols, frequency bands and communication paths.

As described before, the evaluating comprises evaluating a plurality of performance criteria, wherein the plurality of performance criteria comprises signal strength, bandwidth availability, channel occupation due to communications traffic of other devices, availability of a base station or communications tower, and a combination thereof.

Further, the method 400 may comprise re-evaluating available communications protocols, frequency bands and communications paths, and switching between available communications protocols, frequency bands or communications paths based on availability and/or at least one performance criteria.

In accordance with method 400 described with reference to FIG. 4, a non-transitory computer readable medium is provided, wherein the computer readable medium stores computer executable instructions which, when executed by a computer, perform a method as described herein.

It should be appreciated that acts associated with the above-described methodologies, features, and functions (other than any described manual acts) may be carried out by one or more data processing systems, such as for example radio module 310, 312, via operation of at least one processor 330, 332. As used herein, a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system.

The radio module 310, 312 and/or processor 330, 332 that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

The smart selection capability allows the HOT 210 and EOT 100 to remain compatible with standard HOTs and EOTs that only support the Legacy AAR communications protocol while taking advantage of the increased reliability and higher data transfer rates achievable with using IP-based protocols, such as the IEEE 802.16s protocol. The inclusion of significantly more error checking and correction information in messages between HOT 210 and EOT 100 translates into higher radio frequency (RF) signal sensitivity and results in weaker signals being properly decoded on both sides, which makes running longer trains possible. Specifically, HOTs 210 and EOTs 100 equipped with advanced communications-capability, for example SDRs, allow operation of longer trains by taking advantage of improved channel utilization, increased data rates and message payload size, encrypted, secure communication, and forward error checking and correction.

The invention claimed is:

1. An electronic train device for a railway vehicle comprising:
   a radio module configured, through operation of at least one processor, to
      support a plurality of communications protocols and a plurality of frequency bands, and
      select a communications protocol and a frequency band from the plurality of communications protocols and frequency bands based on at least one performance criterion to reliably communicate with another electronic train device,
   wherein the radio module is configured to auto-negotiate with the other electronic train device to determine which frequency band and communications protocol to use, and wherein auto-negotiating includes receiving feedback from the other electronic train device with respect to availability and compatibility of communications protocols and frequency bands, and
   wherein the radio module is configured to switch from a direct device-to-device communication path to an indirect communication path via a base station, utilizing an Internet Protocol (IP)-based communications protocol, upon detection of the base station.

2. The electronic train device of claim 1, further comprising:
   a communication module configured to communicate with the other electronic train device using the selected communications protocol and/or frequency band.

3. The electronic train device of claim 1,
   wherein the electronic train device is configured as an end of train device (EOT), the EOT comprising a tracking device providing location data of the railway vehicle, wherein the tracking device comprises a global positioning system (GPS) receiver or a global navigation satellite system (GNSS) receiver.

4. The electronic train device of claim 1,
   wherein the electronic train device is configured as a head of train device (HOT).

5. The electronic train device of claim 1,
   wherein the plurality of communications protocols comprises AAR S-9152 communications protocol and Internet Protocol (IP)-based communications protocols including IEEE 802.16s IP-based communications protocol.

6. The electronic train device of claim 1,
   wherein the plurality of frequency bands comprises 450 MHZ EOT telemetry band, 220 MHz PTC band, 900 MHZ ATCS band and 160 MHz voice band.

7. The electronic train device of claim 1,
   wherein the radio module is configured to automatically select a communications protocol and/or frequency band based on the at least one performance criterion, and
   wherein the at least one performance criterium is selected from a group comprising signal strength, bandwidth availability, channel occupation due to communications traffic of other devices, availability of a base station or communications tower, and a combination thereof.

8. An automatic train communications system comprising:
   a plurality of electronic train devices,
   a multi-channel communications network,
   wherein each electronic train device comprises a radio module configured, through operation of at least one processor, to
      support a plurality of communications protocols and a plurality of frequency bands, and
      select a communications protocol and/or a frequency band from the plurality of communications protocols and frequency bands based on at least one performance criterion to reliably communicate with one or more electronic train devices via the multi-channel communications network,
   wherein the radio module is configured to auto-negotiate with the one or more electronic train devices to determine which frequency band and communications protocol to use, and wherein auto-negotiating includes receiving feedback from the one or more electronic train devices with respect to availability and compatibility of communications protocols and frequency bands, and
   wherein the radio module is configured to switch from a direct device-to-device communication path to an indirect communication path via a base station, utilizing an Internet Protocol (IP)-based communications protocol, upon detection of the base station.

9. The automatic train communications system of claim 8, further comprising:
   wherein each electronic train device comprises a communication module configured, through operation of the at least one processor, to communicate with the one or more electronic train devices using the selected communications protocol and/or frequency band.

10. The automatic train communications system of claim 8,
    wherein the plurality of electronic train devices is configured to directly communicate with each other.

11. The automatic train communications system of claim 8, further comprising:
one or more base stations,
wherein each electronic train device is configured to indirectly communicate with the one or more electronic train devices via the one or more base stations.

12. The automatic train communications system of claim 8,
wherein the plurality of electronic train devices comprises an EOT and a HOT.

13. A method of communicating between multiple electronic train devices, the method being performed by an electronic train device and comprising:
evaluating available communications protocols, frequency bands and communications paths,
auto-negotiating and selecting a first communications protocol and/or a first frequency band, and communication path based on availability and compatibility with another electronic train device, and
communicating with the other electronic train device using the selected communications protocol and/or frequency band and communication path,
wherein the auto-negotiating comprises receiving feedback from the other electronic train device as to availability and compatibility with respect to the communications protocols and frequency bands, and
switching from a direct device-to-device communication path to an indirect communication path via a base station, utilizing an Internet Protocol (IP)-based communications protocol, upon detection of the base station.

14. The method of claim 13,
wherein the evaluating comprises evaluating a plurality of performance criteria.

15. The method of claim 14,
wherein the plurality of performance criteria comprises signal strength, bandwidth availability, channel occupation due to communications traffic of other devices, availability of a base station or communications tower, and a combination thereof.

16. The method of claim 13, further comprising:
re-evaluating available communications protocols, frequency bands and communications paths, and
switching between available communications protocols, frequency bands or communications paths based on availability and/or at least one performance criteria.

17. A non-transitory computer readable medium storing computer executable instructions that, when executed by a computing device, perform a method of communicating of multiple electronic train devices as claimed in claim 13.

* * * * *